No. 791,393. PATENTED MAY 30, 1905.
J. D. ABBOTT.
DOCK CUTTER.
APPLICATION FILED MAR. 11, 1905.
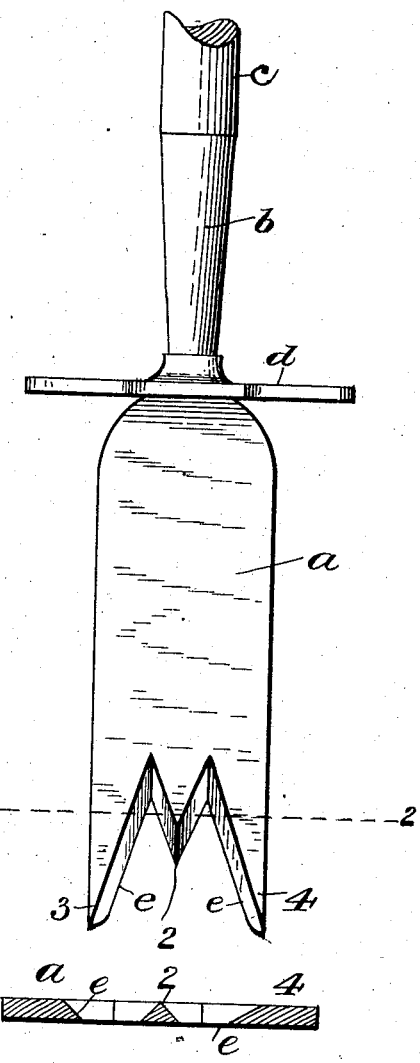
INVENTOR:
John D. Abbott
WITNESSES:

No. 791,393. Patented May 30, 1905.

UNITED STATES PATENT OFFICE.

JOHN D. ABBOTT, OF READING, MICHIGAN.

DOCK-CUTTER.

SPECIFICATION forming part of Letters Patent No. 791,393, dated May 30, 1905.

Application filed March 11, 1905. Serial No. 249,556.

*To all whom it may concern:*

Be it known that I, JOHN D. ABBOTT, a citizen of the United States, residing at Reading, in the county of Hillsdale and State of Michigan, have invented new and useful Improvements in Dock-Cutters, of which the following is a specification.

This invention has relation to farm implements of the type or kind known as "dock cutters or diggers."

It is the object of the invention to provide such improvements as will present a form of cutting edge that will be efficient in engaging, holding, and cutting the root, which shall be convenient and ready of manipulation in performance of the work required of it, and which shall be strong and not easily dulled by contact with stones or other things in the earth or caused to glance aside by contact with said stones or other things.

My improvements are the outgrowth of intelligent and long-continued experience, and every feature is purposely produced—that is, it is designed to overcome some practical difficulty or obstacle.

Reference is to be had to the annexed drawings, forming a part of this specification, and is to be referred to as such.

Of the said drawings, Figure 1 is a front view of the invention, a portion of the upper part of the handle being represented as broken off. Fig. 2 is a cross-section taken in the plane 2 2, Fig. 1.

The same characters of reference designate the same parts or features, as the case may be, wherever they occur.

In the drawings, *a* designates the blade of the digger.

*b* is the ferrule, formed with or as a part of the blade or not, (as may be most convenient,) for the reception of the lower end of the handle *c*.

*d* designates the spading-bar, which is affixed upon the implement, so that by means of the foot of the user the implement may be manipulated in cutting the root and other parts of the docks and other weeds.

*e* designates the cutting edge of the implement, which is made in the form of an inverted letter W. The advantages of this form are many. For example, merely the center prong 2 splits the root of the dock, which is frequently large and very tough, and cuts it, at the same time furnishing four cutting edges upon the one root, making the operation much easier to perform. While the prong 2 is operating to split the root the sides of the prongs 3 and 4 will act to cut the portions intermediate of the central prong and the side prongs 3 and 4, making the work easy and avoiding liability of the implement from slipping off the root.

The blade *a* will be of sufficient length to enable the user to reach the root of any noxious dock, and in addition to length of blade it will be made correspondingly thick and strong.

In all cases to secure the results hereinbefore specified, as well as others, the cutting edge will be ground on a bevel from one side to the other, as shown in Fig. 2, in order not only to form an edge that will not readily become dulled, but one that will not be liable to catch upon stones or the like and cause breakage.

I claim—

1. A dock cutter or weeder, consisting of a long thick blade, provided with a ferrule to receive a handle, and a cutting edge of the form of an inverted W, ground from one side to the other to sharpen it.

2. A dock cutter or weeder, consisting of a long thick blade provided with a ferrule to receive a handle and a cutting edge of the form of an inverted W, ground from one side to the other to sharpen it, combined with a spading cross-bar affixed to the handle.

3. A device of the character described, comprising a blade having a central tapering cutting member and lateral members with their cutting edges diverging downward from the aforesaid member, for effecting the splitting of the root as well as cutting it laterally at one operation.

In testimony whereof I affix my signature in presence of two subscribing witnesses.

JOHN D. ABBOTT.

Witnesses:
D. W. MICKLE,
A. L. KINNEY.